3,019,358
RADIOACTIVE BATTERY WITH CHEMICALLY DISSIMILAR ELECTRODES

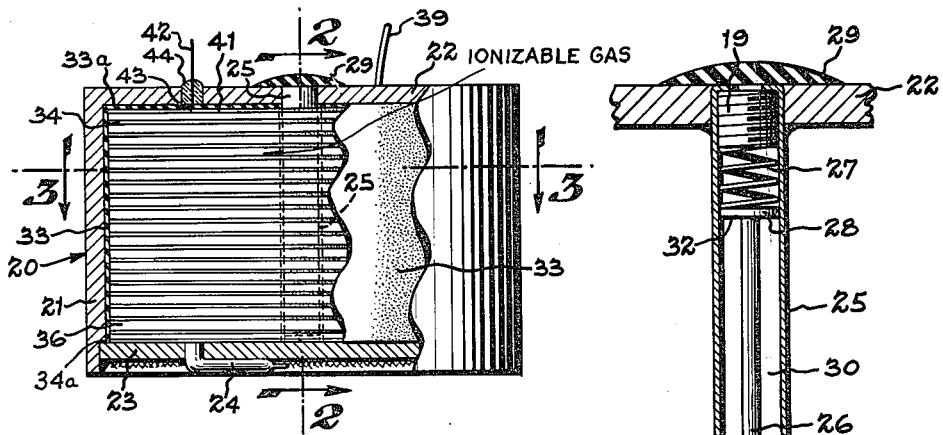
Fig. 1
Fig. 2
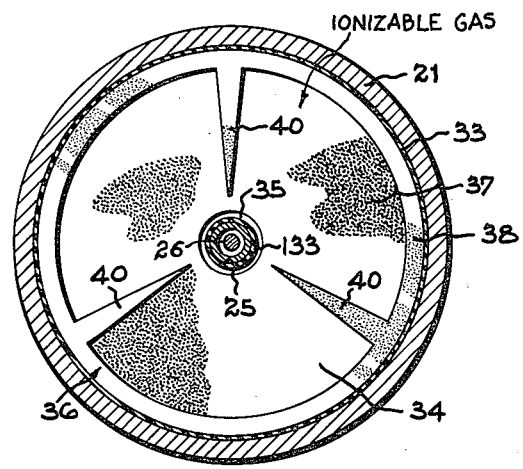
Fig. 3
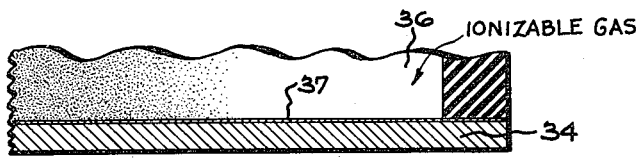
Fig. 4
INVENTOR.
Philip E. Ohmart.
BY Wood, Herron & Evans.
ATTORNEYS.

Philip E. Ohmart, Cincinnati, Ohio, assignor to The Ohmart Corporation, Cincinnati, Ohio, a corporation of Ohio
Filed May 9, 1952, Ser. No. 286,929
3 Claims. (Cl. 310—3)

This invention relates to batteries for delivering electric current which are constituted by radiant energy electric generators. This type of cell is disclosed in my co-pending application Serial No. 233,718, filed June 27, 1951, entitled "Radio Electric Generator," now Patent No. 2,696,564. The principle of operation of the radiant energy electric generator is more particularly disclosed in my second co-pending application Serial No. 266,883, filed January 17, 1952, and entitled "Method of Converting Ionic Energy Into Electrical Energy," now abandoned in favor of continuation application Serial No. 591,173, filed June 13, 1956, and entitled "Method and Apparatus for Converting Ionic Energy Into Electrical Energy." The second specified application explains the present radiant energy electric generator, as follows: when two electrodes which have surfaces which differ chemically from each other are exposed to an ion plasma such as that produced by radioactivity in an ionizable fluid, then selective migration of electrons and ions takes place to relieve the difference of potential, or field bias, between the two dissimilar surfaces; this generates an electric current in an external circuit connecting the two electrodes.

The first named application contains the following description of cell construction and operation: "Depending upon the materials used and the surface conditions of each electrode, the voltage generated in the cell and applied across the load may be made of either polarity desired. For example, using an aluminum outer electrode with stainless steel center electrode, the generated current will flow in the external circuit from the center electrode to the outer one, while if a freshly brushed or sanded aluminum center electrode is substituted for the steel, the current will reverse in direction. The internal functioning of such cells appears to be as follows: Electrons produced by ionization within the cell flow to the electrode which is more active electrochemically, while the positive ions flow to the more noble electrode, where they are neutralized. Electrons flow from the more active electrode through the external circuit to the more noble electrode to replenish those utilized in the neutralization process, and the quantity which flow varies with the ionization in the chamber. Hence, the current generated varies with the type and intensity of radiation incident upon the cell, the molecular weight, ionizing potential, and pressure of the gas separating the electrodes, and the nature of the electrodes themselves and their surfaces. Since the current varies directly with the pressure and the molecular weight of the filling gas, the sensitivity of the cells would be increased by using a heavy gas, xenon, at the highest feasible pressure; or by substituting for the gas ionizable liquids such as benzene and xylene, or semi-conducting solids such as germanium and fluorescent cadmium sulfide, the sensitivity may possibly be still further improved."

The preferred battery of this invention comprises a metal cylinder adapted to be enclosed at each end and adapted to contain a gas under substantial pressure. Mounted in the center of one of the end closures is a well for holding the radioactive material. This well is accessible from the outside of the cylinder so that the electrodes may be mounted in the portion of the cylinder surrounding the well and the battery completed except for the introduction of radioactive material. Then, when the battery is ready for shipment or after shipment and at the place of use, the radioactive material may be inserted in the well without disturbing the electrode assembly.

In other words, the preferred battery of this invention is a two-compartment battery, one compartment enclosing the electrodes and ionizable fluid or gas, the other compartment enclosing the radioactive material. By locating the well at the center of the cylinder, good geometric distribution of the radioactive field may be obtained. Another advantage of the two-compartment structure is that the radioactive material is not exposed to the gas and to pressure; hence, if a leak were to develop, there would be no danger of the radioactive material being picked up by the escaping gas and contaminating the surrounding area.

Further simplification which is effected by this construction has to do with the terminals. In view of the fact that the batteries are intended to last for years, and in view of the fact that a gas under pressure is used in the batteries, the number of seals employed should be reduced to a minimum. On this account I prefer to use the metal housing or casing itself as one terminal of the battery and the well as the second terminal. The well is insulated from the face of the housing which supports it by means of a glass to Kovar seal. Thus, a single size casing and well may be used for a very substantial number of battery types and sizes, the exact characteristics of the battery depending upon the number, composition, and interconnections of the electrodes, on the nature and pressure of the gas employed, and upon the nature and intensity of the radioactivity utilized.

The type of radioactivity to be utilized in the battery, that is, alpha, beta, or gamma radiation, determines in part the choice of the metals to be used in the battery casing or housing and the choice and form of the metals for the electrodes. The disclosure of the present application is made primarily in relation to a battery adapted to be activated by beta emission from a radioactive substance such as strontium-90 or carbon 14. While these materials are relatively rare and expensive today, their availablity should become greater in the course of time. Many of the features of the battery of this invention are of value irrespective of the nature of the radioactivity employed, but during the remainder of this description beta radiation is to be assumed unless the contrary is stated.

With a source of beta radiation in the well of the battery, it is desirable to utilize electrodes of low atomic weight which do not materially impede the beta radiation. On this account it is recommended that only elements be employed which have atomic weights below thirty, and preferably below fourteen to seventeen. Also, it is desirable to fabricate the electrodes as thin as possible in order to provide the greatest possible area of electrode surface as close as possible to the source of radioactivity and to reduce absorption of radiation by the electrodes. While there may be instances in which it is desirable to construct a battery by distributing the radioactive material throughout the electrode structure, the preferred battery of this invention utilizes a discrete unitary locus of radioactive energy which is central to but independent of the electrode structure.

At the present time aluminum and magnesium are commercially available in thin sheet or foil form, and beryllium may be fabricated in such form although not now commercially available. I preferably construct my electrodes of foil or thin sheeting of one of these materials. If desired, the negative surfaces of the foil sheeting may be coated with a thin layer of pure metallic lithium or pure metallic sodium, and the positive surfaces may be coated with pulverized carbon, boron or silicon. In general, it is desirable to provide the greatest possible electrode surface area in relation to the weight of the electrode metal employed. On this account I prefer to use very thin aluminum foil, for instance, .5 thousandths of an inch thick.

Such an electrode inherently is not self-sustaining; that is, it tends to sag or bend so that it cannot be placed in close proximity to the adjacent electrode without danger of short-circuiting. In order to prevent such short-circuiting, I employ electrode separators which perform the function of holding the leaves of foil apart physically. This function has nothing in common with the ordinary separator of an electrolytic cell which is required to insulate the electrodes against electrical short-circuiting. The electrode separator in the present case performs no useful electrical function and, in fact, is a necessary evil from the point of view of cell efficiency. If desired, adjacent electrodes may be separated by thin glass batting or the like or by any light, open material or mesh which holds the sheet of foil apart physically but still provides gas pockets in communication with the electrode on each side. Generally speaking, the less the area of the electrode covered by the spacing material, the greater is the efficiency of the cell.

Since many of the materials which could be conveniently used for electrode spacing tend to be deteriorated by beta radiation, I prefer to use polyethylene, glass, or other plastic to accomplish the electrode spacing. These materials are plastics constituted primarily by carbon and fluorine and are generally called fluorocarbons. These materials are very light, physically stable, pervious to beta radiation, and non-deteriorating in the presence of the radioactivity.

While the foil electrodes may be used for building a battery in which the electrodes are connected in parallel, they are particularly useful for a battery in which the electrodes are connected in series. For instance, a battery may be built by coating aluminum foil one-half of one-thousandth of an inch thick with a thin polymolecular wash of aqueous, pulverant carbon, whereby a unitary or composite electrode is formed which has a positive surface on one side and a negative surface on the other side. Thus, the entire electrode is substantially less than three-fourths of a thousandth of an inch thick. These electrodes may be separated from one another by insulating spacers one-thousandth of an inch thick so that approximately five hundred electrodes per lineal inch of battery may be provided. Potential difference between a pure aluminum surface and a pure carbon surface is approximately two volts so that an inch of battery may provide one thousand volts open circuit potential. The amount of current delivered by such a battery depends upon the electrode area, the gas pressure, gas composition, and the intensity of the radioactivity, all of which may be adjusted to provide any desired amount of power.

Regardless of the electrochemical asymmetry of the materials chosen for the surfaces of the positive and negative electrodes, the amount of potential difference which may exist between any two electrodes has a discrete constant upper limit. In general, potential differences between electrodes of a small fraction of a volt up to five volts are obtainable depending upon the electrode materials chosen. I have now determined that, from the point of view of producing power in the form of electrical current, it is possible to construct a battery of the type under discussion in which the open circuit voltage of the battery is the sum of the open circuit voltages of the individual cells; the neutralizing of positive ions by electrons on the intermediate or composite electrodes does not interfere with the build-up of voltage. However, in a battery in which the individual cells are connected in series, the amount of current which the battery is capable of delivering is limited by the ionization of the cell in which the least ionization takes place. On this account the electrode geometry which is symmetrical in respect to the radioactivity so as to produce equal ionization in each cell provides greatest efficiency from the point of view of converting atomic or ionic energy into electrical energy.

There is one outstanding difference between radiant energy electric generators or batteries and electrolytic cells or batteries which is that the closed circuit of the radiant energy electric generator or battery is variable and depends not only upon the construction of the cell or battery itself but also upon the resistance in the external circuit. This factor is discussed somewhat in my co-pending application, Serial No. 266,883, filed January 17, 1952. If, for instance, the open circuit voltage of a radiant energy electric generator is two volts, then the closed circuit voltage is less than two volts but not by any fixed amount as determined by the internal resistance or impedance of the cell or battery. Rather, a radiant energy electric generator or battery tends to build up a closed circuit voltage to the limit established by the open circuit voltage, the degree to which the closed circuit voltage is lower than the open circuit voltage depending upon the resistance of the external circuit. It is characteristic of the radiant energy electric generator or battery that a constant curent is discharged over a range of closed circuit voltages, that is, from zero up to a value which is critical for that particular cell or battery. If the resistance of the external circuit is increased to further elevate the voltage, then the current drops. Thus, the cell or battery produces peak power current at the highest closed circuit voltage which continues to produce the constant current; at this point the battery may be said to be utilizing all of the available power which the construction of that particular battery provides. This available power is bound to be less than the total power produced by the radioactivity, but for each specific construction having a fixed radioactive field there is an upper limit to the power which can be collected and discharged into the external circuit.

I have discovered and determined that a set of radiant energy electric generators connected in series provides closed circuit voltage greater than the voltage of a single radiant energy electric generator provided sufficient resistance is employed in the external circuit to elevate the voltage. In other words, if a radiant energy electric generator of say two volts open circuit potential is discharging through a given external circuit to provide a closed circuit voltage of a small fraction of a volt and the cell is discharging within its constant current range, then connecting a second cell just like it with it in series does not increase the current in the external circuit nor does it appreciably increase the voltage of the external circuit. However, increasing the resistance in the closed circuit external circuit elevates the closed circuit voltage of the battery without decreasing the current in the constant current range which range is greater for two cells than for one cell.

The foregoing observations pose a seeming paradox or rather an apparent paradox which is constituted by the habits of normal thinking which are appropriate in respect to the use and operation of electrolytic cells. With the latter it is taken for granted that, if two cells are connected in series, the closed circuit voltage fed into the external circuit will be twice as great as it would be if only one cell were used in the same circuit. With radiant energy electric generators operating at power peak or at voltages below power peak voltage, that is, in the constant current range, the connecting of cells in series does not increase the voltage in the external circuit. In other words, if a single radiant energy electric generator of proper structure and an open circuit voltage of say two volts is discharging into a closed external circuit at a voltage of say one volt (a voltage below power peak voltage), then the addition of one or two or ten or a hundred similar cells connected in series and discharging into the same external circuit does not increase the voltage in the external circuit. While at first blush this result may seem preposterous, it is to be remembered that the resistance of the external circuit in the example given remains constant, the cell or cells are discharging in the constant current range, that is, they are producing maximum current; the connecting of like cells in series does not increase the available current so that the amperage, as well as the resistance, is a constant. Thus, the voltage, too, remains a constant irrespective of the number of cells connected in series.

The present disclosure is primarily concerned with the construction of radiant energy electric batteries which are suitable for delivering working current, particularly currents which are adapted for uses other than mere scientific measurements. The invention is primarily concerned with the physical construction of a radiant energy electric battery, that is, with the housing and with the electrode construction whereby the cells, on component radiant energy electric generators, are combined into a practical battery.

The primary concept of the present invention is a radiant energy electric battery which is constituted by a relatively standard housing, in which elecrodes of any desired number or type may be disposed and which may be activated by introduction of radioactive material just prior to use.

If the battery is to be used under continuous and constant closed circuit conditions or if the battery is being designed to meet a constant or probable power requirement, then the battery should be designed to have a power peak which corresponds with the external circuit requirement. If the resistance in the external circuit is known in ohms and the required power is known in watts, then a unique ratio of volts to amperes is necessary to satisfy the conditions. As stated, it is generally desirable to design a battery which operates at about its power peak under the service load and, if the requirements of the external circuit are to be variable, the battery must have a power peak which satisfies the maximum requirement of the external circuit. Any given radiant energy electric generator may have a power peak at say 50 or 75 percent of the open circuit voltage of the cell, depending upon the geometry of the cell and the asymmetry of the chemistry of the electrode surfaces. In general, it is necessary to connect enough cells in series to provide an open circuit voltage which is appreciably higher than the desired closed circuit voltage, the exact amount depending upon the coordination of all of the factors which enter into operation of the cell including the amount, nature and geometrical distribution of the radioactivity, the nature and pressure of the gas employed, the spacing of the electrodes, the thickness of the electrodes, the area of the electrodes, and the chemical asymmetry of the surfaces of the electrodes. With this very substantial number of variables and with no one of them contributing a wholly independent effect under closed circuit conditions, it is transparently impossible to generalize the rules of operation of the radiant energy electric generators by mathematical formulae which are concise. However, the principle involved is that a radiant energy electric generator has a constant current range from zero up to a voltage less than open circuit voltage and a power peak at the highest voltage which supports the constant amperage; this principle should suffice to enable the skilled in the art to fabricate batteries constituted by radiant energy electric generators connected in series which approximate the requirements of any given external circuit at reasonable power conversion efficiency.

These and other advantages of the present invention will be more clearly understood from a further consideration of the following detailed description of the drawings showing typical embodiments of the invention.

In the drawings:

FIGURE 1 is an elevational view of a series battery, the outer casing being partially broken away to show details of the interior construction.

FIGURE 2 is a cross sectional view taken along line 2—2 of FIGURE 1 showing the chamber containing the radioactive material.

FIGURE 3 is a cross sectional view taken along line 3—3 of FIGURE 1.

FIGURE 4 is a greatly enlarged, partial cross sectional view through one of the electrodes and the adjacent insulating material.

As shown in FIGURE 1, a series type radiant energy electric generator, or battery constructed in accordance with this invention includes a container 20 constituted by a cylindrical side wall 21, a top 22, shown integral with the side wall, and a bottom 23, which is disclosed as countersunk to the cylindrical side wall 21. The container may be used either side up and it need not be cylindrical, in fact the container may be square, hexagonal or of any shape desired for any particular use. Neither is it necessary that one end closure of the container be integral with the side wall. In fact, the container may be fabricated in any desired manner, that is, by welding, soldering or otherwise, the primary requirement being that the container be gas tight in order that a gas under substantial pressure may be used in the battery.

Within the container a substantial amount of electrode material is disposed, that is, the container houses positive and negative electrodes which have surface area which is very substantial in relation to the volume of the container or house. The combination of large electrode area and high gas pressure within relatively small volumetric space provides conditions whereby the available radioactivity is utilized to best advantage. Preferably, the entire closure is completed, after which the air or gas on the inside of the container is exhausted through tube 24, which is disposed within the bottom of the container. Heat may be used if desired to assist in complete exhaustion of air from the container after which the container is filled with gas to the desired gas pressure and the pipe 24 is closed.

Mounted within the cylindrical container, preferably coaxially, is a tubular member 25 which extends axially from a point adjacent to the top of the container to the bottom or at least part way down into the container. This member forms a chamber 30 adapted to contain radioactive material in any convenient form such as slug or wire 26 which is held in position by a spring 27 having a head 28 bearing against it. The tubular member 25 may be constructed of any suitable material but is preferably formed of one such as brass readily pervious to the type of radiations emitted by the source employed but impervious to migration of the source material. The manner in which the radioactive material is affixed within the chamber is not important, and any desired device or arrangement may be employed to accomplish positioning of the radioactive material. The chamber 30 is closed by means of a plug 19 threaded into one end; tube 25 being crimped over the plug. A sealing material such as wax or plastic is placed over the plug and end of tube 25 as at 29 to insure against leakage of the radioactive material into the surrounding air.

While the distribution of the radioactive material within the chamber may vary with different types of batteries, it is particularly important in the series construction of the type shown in FIGURE 1 that the radioactivity be distributed so that each component cell of the battery is subjected to an adequate amount of radiation for it to generate the requisite current. As previously pointed out, in a series battery the total output current of the battery is limited by the current generated in the least productive cell so that if any cell has a current producing capacity appreciably less than the rest, part of the ionizing energy impinging upon the other cells is wasted.

In the construction shown in FIGURE 1, chamber 30 preferably extends a substantial distance from the top of the casing 22 toward the bottom 23. Inside of the chamber the radioactive material is distributed from the bottom 31 of tubular member 25 to a point 32 approximately as far above the center of the cell as bottom 31 is below it. In this manner the radioactivity is relatively well distributed among the various component cells. The inner surfaces of the side walls 21 and top 22 are preferably insulated from the electrodes by some insulating material such as a plastic sheet 33 and 33a which is molded or otherwise shaped to conform to the inner surface of the container and the outer surface of tubular member 25.

One preferred form of electrode construction for use in this type of cell involves the formation of composite electrodes. That is, a series of unitary structural members are formed, each of which constitutes a positive or negative electrode of one radiant energy electric generator and a negative or positive electrode of a second radiant energy electric generator. As shown somewhat diagrammatically in FIGURE 4, each composite electrode is constituted by a thin disc 34 formed of a suitable electrode material such as a metal or metallic oxide. This disc may be fabricated from an extremely thin sheet, for example one of the order of five ten-thousandths of an inch thick. One side of this disc is covered with a thin coating 37 of a second electrode material chemically dissimilar from the first. Among suitable materials for forming this electrode surface are a coating of colloidal graphite or Aquadag, a vaporized metal such as magnesium, or a plated metal or metallic oxide such as lead oxide. The choice of the particular materials utilized as electrode is generally made on a basis of many considerations such as ease of fabrication and the desired open circuit potential of the cell.

I have found that, when pure metallic electrodes are desired, good results can be obtained by employing various reduction procedures, such as passing hydrogen through the cell at low pressure before introducing the filling gas. As the hydrogen is passed through the cell, it is ionized by exposing it to large quantities of radioactivity or in any other suitable manner.

Each of the composite electrodes is provided with a central aperture 35 for receiving the tubular member 25 and insulating sheet material 133. The electrodes are stacked within the casing transverse to its axis and parallel to one another in such a manner that the coated surface 37 of each lies in the same relative position; that is, they all either face upwardly or downwardly. Every pair of adjacent electrodes is separated by a thin insulator 36, constructed of any suitable material such as Teflon or spun glass. These insulators are preferably made thin, for example ten one-thousandths of an inch, so that the electrode spacing is reduced to a minimum and a maximum amount of electrode area can be distributed within any given container. One particularly desirable form of insulator configuration is shown in FIGURE 3; the insulator there shown is constituted by an annular band 38 disposed at the periphery of the electrode disc 34 and a plurality of inwardly projecting strips or spokes 40. The spokes are essential since a thin electrode disc is not a stable structural member adapted to withstand deformation. However, by orienting each of the spacers 36 so that the spokes 40 are in alignment and form a vertical column, the electrodes being interposed between, a stable structural arrangement is achieved.

In a series type battery, each surface together with the opposing surface of the adjacent composite electrode, and the ionizable fluid intermediate the two constitute an individual or component radiant energy electric generator. These cells are all connected in series, the bottom electrode 34a of the lowermost cell being in electrical connection with the housing, preferably through contact with bottom member 23. Each of the other electrodes is insulated from the adjacent electrodes, the casing and the tubular member 25, except for the uppermost electrode 41 which is joined to a suitable lead 42 as at 43. Lead 42 passes through an opening in the insulating sheet 33a and emerges from the container through a suitable insulator such as a glass to Kovar seal 44. Preferably the electrode arrangement is such that the casing is at a lower potential than lead 42 so that lead 42 constitutes the positive lead of the battery and an egative lead 39 may be taken from the casing at any convenient point. The open circuit potential across leads 39 and 42 will be equal to the sum of the open circuit potentials of the component radiant energy electric generators, while the closed circuit voltage will be some value less than this open circuit potential.

Having described my invention, I claim:

1. A radiant energy electric generator comprising an outer casing and an inner casing, said inner casing being adapted to contain a radioactive substance and being constructed of a material pervious to the radiations from said substance, a quantity of radioactive material disposed within said inner casing, a plurality of spaced composite electrode members disposed within said outer casing, a quantity of ionizable fluid in contact with said composite electrode members, each of said composite electrode members comprising a thin disc constructed of an electrode material and coated on one side with a second electrode material chemically dissimilar from the first electrode material, said discs being disposed within said outer casing in a parallel spaced relationship so that each of the coated surfaces is disposed in the same relative position, whereby the opposed surfaces of adjacent electrode members are chemically dissimilar, one of said plurality of composite electrode members being connected to said casing, a second of said composite electrode members disposed relative to the first so that the remaining electrode members are disposed intermediate the two being connected to a lead insulated from said outer casing, insulating material interposed between said composite electrode members, said insulating material extending over only a portion of said discs, each of said remaining electrode members also being insulated from said outer casing.

2. A radiant energy electric generator comprising an outer casing, an inner casing mounted within said outer casing, a quantity of radioactive material disposed within said inner casing, an ionizable gas disposed within said outer casing, a plurality of composite electrode members, said composite electrode members each being constituted by a thin disc of material having a coating of an electrochemically dissimilar material on one side thereof and being configured to form an opening for receiving said inner casing, said composite electrode members being disposed in parallel relationship within said outer casing, the coated surface of each of said composite electrode members being disposed in the same relative position, whereby the opposed surfaces of adjacent composite electrode members are electrochemically dissimilar, insulator members disposed intermediate adjacent composite electrode members, said insulator members including a plurality of radial spokes, the radial spokes of each of said insulators being disposed in alignment with one another to form a rigid structure, means of providing an electrical connection to at least two of said composite electrode members.

3. A radiant energy electric generator comprising an outer casing, an inner casing mounted within said outer casing, a quantity of radioactive material disposed within said inner casing, an ionizable gas disposed within said outer casing, a plurality of composite electrodes, said composite electrodes each being constituted by a thin disc of material having a coating of a dissimilar material on one side thereof and being configured to form an opening for receiving said inner casing, said composite electrodes being disposed in parallel relationship within said outer casing, the coated surface of each of said composite electrodes being disposed in the same relative position, whereby the opposed surfaces of adjacent composite electrodes are electrochemically dissimilar, insulator members disposed intermediate adjacent composite electrodes, said insulator members including a plurality of radial spokes, said spokes tapering in width from the periphery of said discs toward the center thereof, the radial spokes of each of said insulators being disposed in alignment with one another to form a rigid structure, means of providing an electrical connection to at least two of said composite electrodes.

References Cited in the file of this patent

UNITED STATES PATENTS

| | | |
|---|---|---|
| 1,317,082 | Hartenheim | Sept. 23, 1919 |
| 2,271,910 | Bluemle | Feb. 3, 1942 |
| 2,371,278 | Berghaus et al. | Mar. 13, 1945 |
| 2,482,266 | Goshorn | Sept. 20, 1949 |
| 2,527,945 | Linder | Oct. 31, 1950 |
| 2,540,341 | McNail | Feb. 6, 1951 |
| 2,555,143 | Linder | May 29, 1951 |
| 2,562,961 | Stratford et al. | Aug. 7, 1951 |
| 2,604,556 | Daly et al. | July 22, 1952 |
| 2,629,837 | Benade et al. | Feb. 24, 1953 |
| 2,631,246 | Christian | Mar. 10, 1953 |
| 2,640,953 | Rossi | June 2, 1953 |
| 2,661,431 | Linder | Dec. 1, 1953 |
| 2,696,564 | Ohmart | Dec. 7, 1954 |
| 2,728,004 | Victoreen et al. | Dec. 20, 1955 |

OTHER REFERENCES

A new Electronic Battery, excerpt from Electrician, October 1, 1924.

Sears and Zimansky: "College Physics," published by Addison-Wesley Pub. Co., Inc., 2nd Ed., 1952, p. 418.

Perkins: "College Physics," pub. by Prentice-Hall Inc., 1946, p. 534.

Millman and Seely, "Electronics," pub. by McGraw-Hill Book Co., Inc., 1951, pp. 107 and 143.

"Alkaline Storage Batteries" by Wallace M. Schleicher, pp. 2009–2011; Standard Handbook for Electrical Engineers; 8th Ed.; McGraw-Hill (1949); New York.